Sept. 15, 1953  C. L. OTTO, JR  2,651,842
INTEGRATING COMPASS
Filed July 25, 1947  3 Sheets-Sheet 1
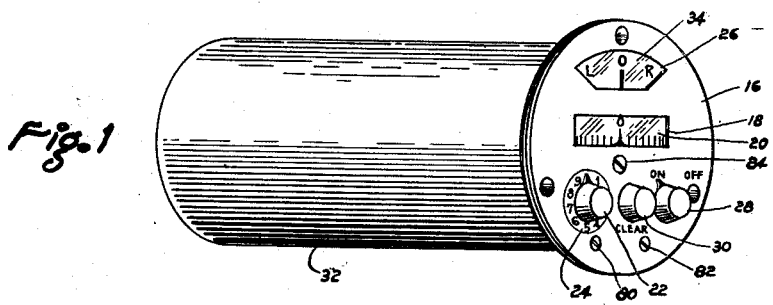
Fig. 1
Fig. 2
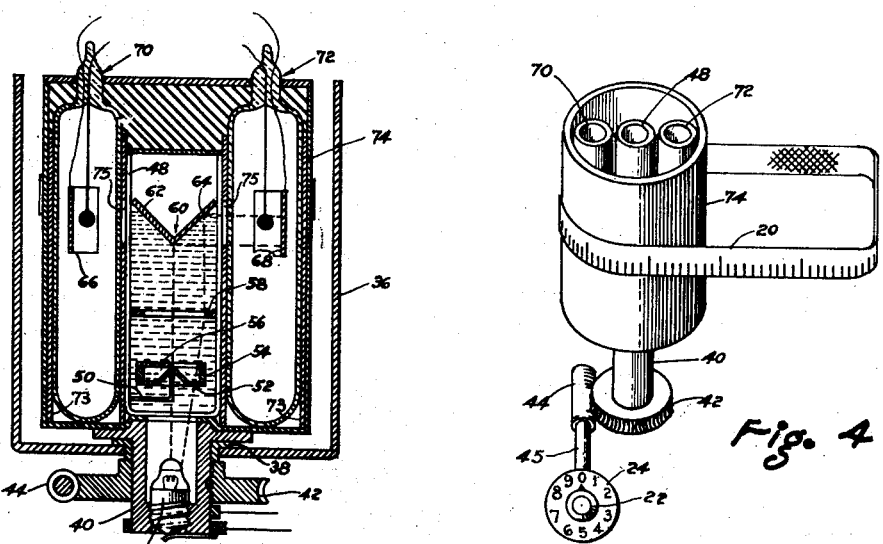
Fig. 3  Fig. 4
INVENTOR.
CARL L. OTTO JR.
BY 
ATTORNEY Sept. 15, 1953 C. L. OTTO, JR 2,651,842
INTEGRATING COMPASS
Filed July 25, 1947 3 Sheets-Sheet 2

INVENTOR.
CARL L. OTTO JR.
BY
ATTORNEY

Patented Sept. 15, 1953

2,651,842

UNITED STATES PATENT OFFICE 2,651,842

INTEGRATING COMPASS

Carl L. Otto, Jr., Lummi, Wash.

Application July 25, 1947, Serial No. 763,521

16 Claims. (Cl. 33—1)

This invention relates to the integration of signals derived from directional instruments, and in particular, it relates to the integration of signals derived from a magnetic compass for the purpose of aiding in the guidance of manually controlled aircraft.

An object of the invention is to provide apparatus for automatically summing the swings of a magnetic compass, whereby the pilot may safely remove his attention from the compass for a longer period than has been practical heretofore.

Another object of the invention is to provide means for reducing pilot fatigue in manually operated aircraft by greatly reducing the number of directional corrections required.

It is also an object of the invention to provide apparatus for the guidance of manually operated aircraft, whereby a magnetic course may be followed with greater accuracy than heretofore.

A further object of the invention is the provision of apparatus for the automatic dead reckoning of minor excursions from the planned course, and the constant indication to the pilot of the most direct heading on which he should fly to return to and blend with planned course.

A feature of the invention is the structural simplicity of its component sections, in view of their complexity of function. For this reason the various sections are both severally and jointly adaptable for use in other fields than that originally intended, as for example, ship navigation, industrial control and laboratory instrumentation.

With these and other features and objects in view, which will become apparent as the specification proceeds, the invention will be best understood by reference to the following specifications and claims and the illustrations in the accompanying drawings, in which:

Fig. 1 is a three-quarter front elevation of an instrument according to the invention;

Fig. 2 is a block diagram showing the operational sequence of the components of the apparatus;

Fig. 3 is an axial section through the compass and signal take-off portion of the apparatus;

Fig. 4 is a perspective elevation of the compass portion and associated parts;

Figure 5:
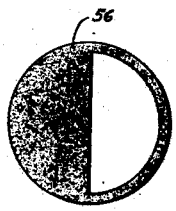
Fig. 5 is a plan of one form of compass mask.

It is well known that the flight of aircraft is disturbed by turbulent weather to the extent that both the compass card and the aircraft itself tend to swing in azimuth in an irregular, somewhat oscillatory manner. In the case of an aircraft that succeeds in following a straight course, it can be shown that the algebraic sum of these swings, over a period of time, is zero, or very nearly so. However, from the viewpoint of the pilot, the effect of the combined motions is confusing and cannot easily be interpreted without mechanical assistance.

Mechanical assistance has been provided by the art, mainly in the form of controlled-inertia compasses or gyro devices, which have the effect of minimizing or eliminating certain of the swinging motions, rendering the performance in turbulent air, or in turns, more nearly equal to that in still air. However, even in still air the pilot of a manually controlled aircraft is not relieved from the tedious watching of the compass, when following a magnetic course.

The present invention approaches the problem in a different manner. No attempt is made to reduce the compass swinging, or the northerly turning error. The response of the compass card is rapid, and course error signals are caused to actuate a left-right indicator needle. A portion of the course error signal energy is diverted to an integrator, where it is mixed with the energy of previous deviations, the algebraic sum being then applied to the indicator needle as a superimposed deflection. The deflection observed by the pilot is, therefore, the sum of the instantaneous and the accumulated deviations; by turning the aircraft so as to return the needle to zero when in level flight, both deviations are corrected. The correcting turn need not be precise, as any remaining integrated deviation will again be integrated and will be corrected at the next check of heading.

The following is a description of the novel features and arrangement of the invention, omitting details that can be readily supplied by those skilled in the art:

Referring first to Figs. 1, 3 and 4, a preferred form of the integrating compass comprises a compass face 16 including a course setting window 18 behind which is a calibrated tape 20 which may be set for any course in azimuth by means of a knob 22, the latter carrying a vernier scale 24. Preferably, the vernier scale carries one degree calibrations and the tape 20 is calibrated in 10 degree increments from zero to 360 degrees. The instrument face further carries an indicator window 26 behind which is a left-right indicator 34 which, as will be later explained comprises a D'Arsonval type galvanometer. The instrument face is further provided with an on-off switch 28 and a clearing button 30. Behind the face of the instrument is a cylindrical container 32 containing the several elements of the instrument which produce the effects previously mentioned. The several instrument components are indicated in Fig. 2 comprising as noted, a compass, a signal take-off associated therewith, an integrator for the signal, an amplifier for the integrated signal and the indicator which is the galvanometer 34.

The compass and signal take-off sections of the instrument are shown in Figs. 3 and 4 and preferably, are supported in a channel member 36 which extends longitudinally through the cylinder 32 to form a structural support for the several instrument components. In the lower portion of the channel, a bushing 38 is provided to support a rotatable head 40 carrying a worm wheel 42 engaged by a worm 44 whose shaft 46 extends through the face of the instrument to carry the knob 22 and its dial 24. The head 40 is hollow and contains a light bulb 46 having an integral condenser or other source of illumination which may include a condenser lens, not shown, the rays therefrom projecting upwardly through a cylindrical glass container 48 filled with liquid for compass damping and carrying certain of the optical components of the instrument. In the lower part of the glass container 48 is a compass element supported on a pivot 50. The compass element comprising a glass base 52 formed with a bearing to allow tipping of the compass card on the pivot through a working range of about 30 degrees from the horizontal. Upon the base 52 are superimposed one or more magnetic elements preferably formed as a peripheral annulus or two semi-circular rings appropriately magnetized to respond to surrounding magnetic fields, the light path being within the annular magnet components. The magnet elements are indicated at 54. Above the magnet elements and secured thereto is a mask 56 of the form shown in Fig. 5 or 6. It will be noted in Fig. 5 that half of the mask is opaque and half is clear, so that illumination from the lamp passes upwardly through half of the compass card. In the arrangement of Fig. 6, the unmasked portion has a predetermined geometrical shape to provide a certain pattern of illumination to attain results which will be described shortly.

Figure 7:
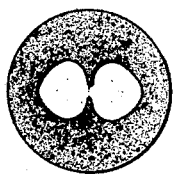
Fig. 7 is a plan of one form of light distributor.

Illumination passing through a portion of the compass card passes upwardly through the liquid and through a mask 58 having outer opaque portions and central clear portions of the geometric form shown in Fig. 7. Thereupon, the illumination reaches a beam splitter 60 comprising diffusing reflecting surfaces 62 and 64 which reflect the light to a horizontal path for reception upon the sensitive cathodes 66 and 68 respectively of phototubes 70 and 72 respectively.

The phototubes are carried in tubes 73, with apertures 75, in a drum 74 adjacent the glass container 48 and are firmly secured in the proper position with respect to the compass components, the drum 74 being firmly secured to the rotating element 40 carried in the channel 36.

Figure 6:
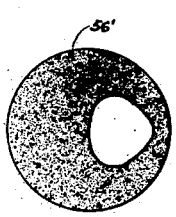
Fig. 6 is a plan of an alternative form of compass mask.
Figure 8:
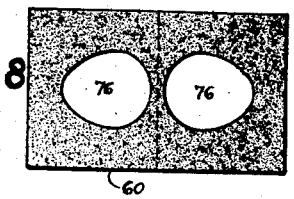
Fig. 8 is a developed plan of an alternative form of light distributor.
Figure 9:
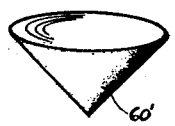
Fig. 9 is an elevation of another alternative form of light distributor.

The compass mask 56 in Fig. 5 is adapted to cooperate with the mask of Fig. 7 or the arrangement of Fig. 8. The compass mask 56' of Fig. 6 may be used with a plain diffusing splitter, with no screened or opaqued areas. The Fig. 8 splitter comprises non-reflecting areas on the surfaces of the splitter 60 leaving diffusing reflecting surfaces 76 thereon of a particular form to attain illumination of one or both phototubes upon swinging of the compass. In Fig. 9, the splitter is shown as a diffusion reflecting cone 60' which may be substituted for the arrangements of Figs. 6, 7 or 8 to secure the desired relationship of illumination on the phototube cathodes upon swinging of the compass. The desired arrangement of light distribution will be explained.

In Fig. 4, the drum 74 is shown as comprising, in effect, a belt pulley over which is run the azimuth indicating belt 20. The drum 74 with its associated parts is normally disposed in the rearward portion of the instrument container 32 to divorce the sensitive compass element insofar as possible from magnetic influences of the galvanometer 34 and other parts. The compass element 54 may further be provided with adjustable compensating devices in a manner well known in the art to cancel out stray fields which may be present near the location of the instrument in an aircraft. The belt 20 mentioned above extends from the rearwardly located drum 74 through or around the channel 36 to the forward or face part of the instrument where it is run over appropriate guides behind the window 18. Rotation of the drum 74 by manipulation of the knob 22 sets a desired course on the tape 20 so that the lower edge of the splitter 60 will lie at right angles to the cross axis of the compass mask 56 when the instrument is headed on the preset course, whereby the intensity of illumination on each of the phototubes 70 and 72 will be equal to attain, as will be described, a zero reading on the indicator 34.

Figure 10:
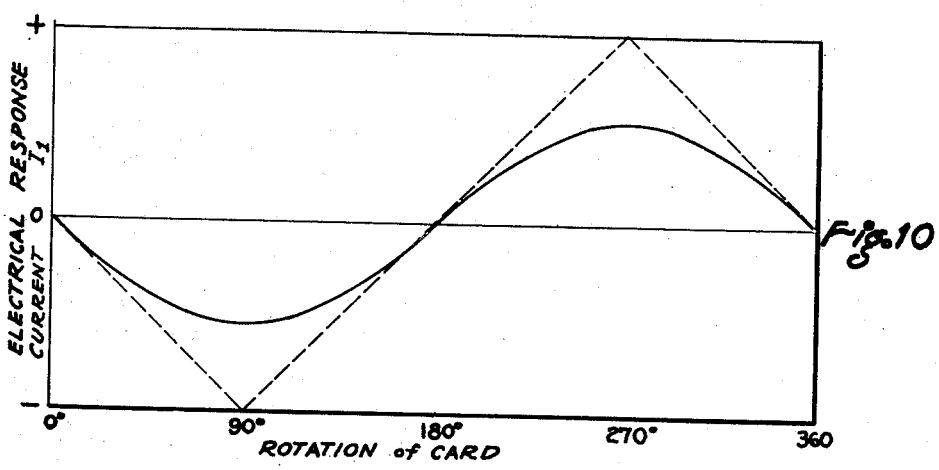
Fig. 10 is a chart showing the response characteristics of the compass and take-off portion of the instrument.
Figure 12:
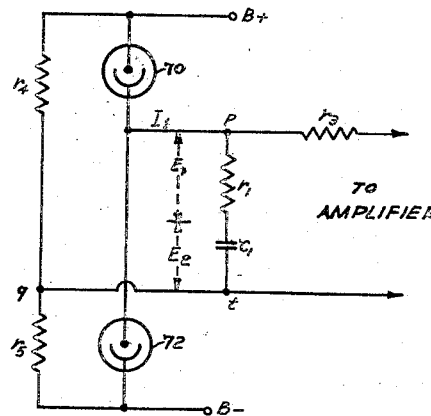
Fig. 12 is a simplified wiring diagram of one form of integrator.
Figure 13:
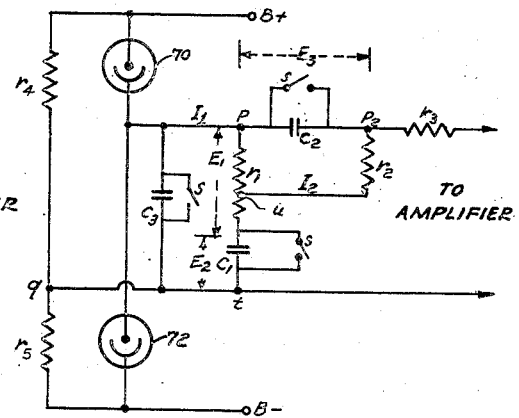
Fig. 13 is a wiring diagram of a preferred embodiment of an integrator.

In converting the illumination from the light 46 through the compass mask and splitter into electrical response characteristics from the phototubes, a sinusoidal current pattern is attained by virtue of the geometric configuration of the mask and/or splitter in order that the current $I_1$ indicated in Fig. 10 will represent the sine of the angle of departure from the planned or preset heading. The dotted line in Fig. 10 represents the current $I$ as it would be without the mask; the solid line represents the current as modulated by the configuration of the mask. Assuming that the aircraft operates at substantially constant cruising speed, the current $I_1$ thus represents the speed of aircraft departure from the plotted course which, when integrated against time in the integrator section to be described, becomes a measure of aircraft distance from the plotted course. In operation, any course deviation produces a differential illumination upon the cathodes of the phototubes 70 and 72. Said tubes are of high vacuum type and are normally operated at a potential in excess of 23 volts. It is well known that under these conditions phototube output current is substantially linear with respect to luminous input. It is also known that when phototubes subject to these conditions are connected in series, as shown in Figs. 12 and 13, the current $I_1$ will represent the difference in illumination imposed on the two tubes and will be substantially independent of the potential over a relatively wide range. The light intensity on the phototubes is established as a sine function of the angle of deviation from true course by virtue of the shape of the compass mask, the clear portions of the splitter or the clear portions of the intervening mask.

Referring to Fig. 12, it is well known that an electrical capacitor will serve as a reservoir for the purpose of time-based integration. In this case the capacitor $C_1$, having relatively large capacity and low leakage, is based upon the line $q$—$t$ which is held at a potential approximately in the center of the B-supply by the substantially equal divider resistors $r_4$ and $r_5$. The output resistor $r_3$ is so high as to have negligible effect upon the operation of the integrator, and serves as an electrical take-off whereby the final indication of the instrument is made to follow the potential at point $p$.

Operation of the integrator is best understood by considering the current $I_1$, which, as explained before, represents the rate of departure of the aircraft from its intended course. Substantially all of this current flows through the resistor $r_1$ and to the capacitor $C_1$. With this in mind, and starting now with the craft on course, the illumination is balanced, the current $I_1$ is therefor zero, and the potential at $p$ is therefor the same as at $t$. Let us say that now a deviation from the original heading occurs. The resulting unbalance of illumination causes a current $I_1$ through the resistor $r_1$, giving rise to an instantaneous potential $E_1$, which is detected at $p$ through $r_3$ and amplified to produce an instantaneous deflection of the indicator 34, representing to the pilot his rate of departure from the intended course.

Simultaneously the current $I_1$ is slowly charging the capacitor $C_1$ giving rise to another potential $E_2$, which adds to the potential between $p$ and $t$, thus causing additional deflection of the indicator 34, representing to the pilot his distance from the original course. The two indications blend into a single motion, giving composite information to the pilot.

Let us now say that the craft is turned to the original magnetic heading by means of other apparatus, such as a conventional compass. The current $I_1$ will drop to zero and $E_1$ will disappear, but $E_2$ will remain, leaving a remnant displacement on the indicator 34 representing distance from the original course. In order to remove this remnant displacement it is necessary for the pilot to turn the craft still further away from the direction of displacement, thereby creating a negative $E_1$ which balances the remnant $E_2$ and thus returns the indicator to zero. The instrument is now leading the pilot back to his original course. Meanwhile, the negative current $I_1$ is slowly removing the charge from $C_1$, and by the time the craft has returned a distance equivalent to the displacement from the original course, the remnant charge will have been completely removed. The instrument is then back in its original condition, and the indicator will show zero when the craft is headed in the intended magnetic direction.

Since the charge on $C_1$ represents the net displacement from course, it is apparent that any number of deviations, large or small, and in either direction can be processed by the instrument until such time as the accumulation in one direction causes the potential at $p$ to come within 23 volts of one side of the supply potential, at which limit the phototubes cease to be linear in operation. This is the practical limit of the instrument, and the pilot will recognize it by the extreme deflection of the indicator. He is expected to make a correction in heading before this occurs. It is also apparent that northerly turning errors will, in the long run, cause equal and opposite charges, and will cancel each other out. An assumption of constant cruising speed is necessary for the highest accuracy of recovery; however, the results will also hold true, for practical purposes, during the gradual and infrequent changes of speed that may occur in the normal cruising of aircraft. Speed response may be secured by varying illumination intensity as a function thereof.

A feature of the invention lies in the summation of the potentials $E_1$ and $E_2$, thereby presenting a condensation of both instantaneous and accumulated information to the pilot, relieving him of the necessity of concentrating upon or analyzing the movements of the compass, and enabling him to correct both with a single movement and at relatively widely separated intervals.

Fig. 13 shows a preferred form of integrator circuit, in which the capacitor $C_2$, with parallel resistor $r_2$, has been added to improve the recovery characteristic. In this embodiment a current $I_2$, being a portion of $I_1$, passes through the capacitor $C_2$, causing it to be charged whenever $C_1$ is charged. The time constant $C_2$, $r_2$ is of the same order as $C_1$, $r_1$, and the tap $u$ is adjusted so that the two charging rates are the same, under average operating conditions. From the viewpoint of $r_3$ the two charges momentarily cancel each other; that is, $E_3$ neutralizes $E_2$, momentarily suppressing the appearance of the latter in the net indication. This embodiment, therefor, maintains a pure indication of heading during the initial excursion. As recovery is initiated, the first turning of the craft to place the needle at zero puts it on a heading parallel to the original. Thereupon $I_1$ ceases, and $C_2$ slowly discharges through $r_2$, permitting $E_2$ to cause an increasing deflection of the indicator needle, that normally reaches a peak within one or two minutes after the start of recovery. The appearance of this indication causes the pilot to head the craft back toward the original course. Recovery will be completed sooner and more definitely than in the case of the simplified circuit, because $C_2$ charges in reverse during most of the recovery period, masking the discharge of $C_1$. This process tapers off, however, as the two rates do not continue to be identical, so that if no further deviations occur, both capacitors will normally be discharged by the time the original course is regained.

Figure 11:
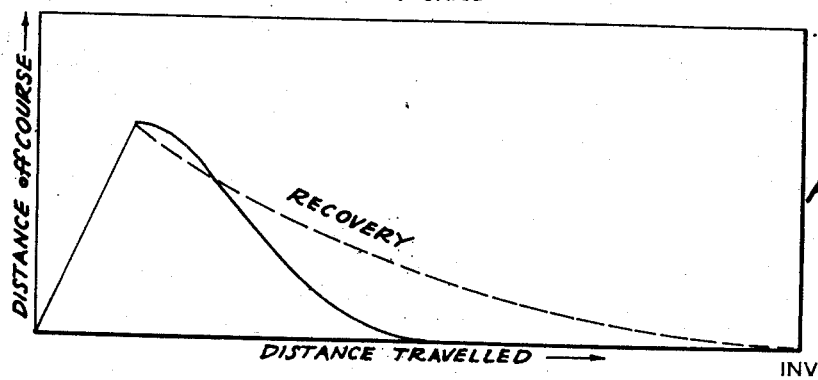
Fig. 11 is a chart showing the recovery characteristics of the entire instrument following a deviation from a planned course.

Fig. 11 illustrates the difference in recovery characteristic of the two circuits. The broken line represents the recovery characteristic of the circuit of Fig. 12, while the solid line represents the recovery characteristic of the circuit of Fig. 13.

A damping capacitor $C_3$ (Fig. 13) is introduced to absorb surges due to oscillation of the compass card, and to prevent these from encroaching upon the limits of operation already mentioned. The three capacitors are provided with discharging switches $s$, which may be coincidentally operated by the button 30 on the instrument face, for the purpose of removing residual charges at the time of setting a new course.

The function of the amplifier is to raise the relatively weak signal current through the resistor $r$ to a sufficient strength to operate the indicator 34.

Figure 14:
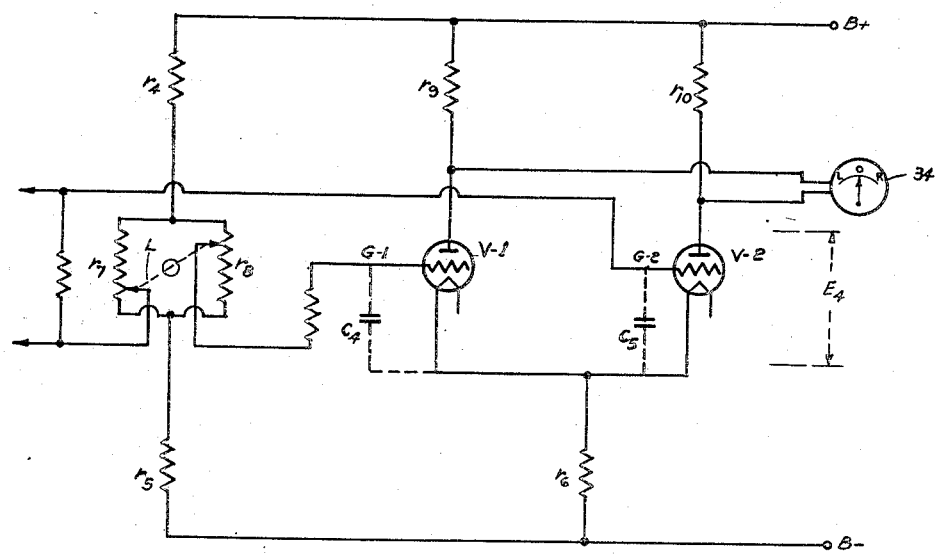
Fig. 14 is a simplified wiring diagram of an amplifier.

Duplicate high-mu triodes $V_1$ and $V_2$ are connected as shown in Fig. 14 with separate plate resistors and a common cathode resistor, the resistors being of such value that the potential spread $E_4$ across the tubes is normally about one quarter, or less, of the total spread of the B supply, and substantially in the center of the spread thereof. The load resistances $r_9$ and $r_{10}$ are high with respect to that of the indicator 34, the latter comprising a voltage responsive galvanometer. The grids are returned to the divider $r_4$, $r_5$, previously mentioned, for bias in substantially the center of the B supply spread. The resistors $r_7$, $r_8$, which for convenience were not shown in the previous circuits, are normally mechanically joined by the link L, so that one slider increases potential as the other decreases. Stabilizing capacitors $C_4$ and $C_5$ may be added where it is necessary to eliminate radio interference.

The circuit may be balanced by first loosening the linkage L and moving the sliders up or down together to adjust $E_4$, then tightening the linkage and turning it to set the zero of the indicator 34.

In operation, the two triodes will always have substantially the same potential spread, because of the relatively low resistance of the indicator 34, also because the cathodes are tied together, and also because of the stabilizing action of the resistors $r_6$, $r_9$ and $r_{10}$. Let us assume, then, that a signal makes $G_2$ slightly more positive, increasing the current momentarily through $V_2$. This will cause a slight increase in the potential spread across $r_6$ which will raise the potential of both cathodes, cutting down thereby a portion of the increased current in $V_2$, but also reducing the current through $V_1$. The circuit thus levels itself at substantially the original total current, but with a very different distribution between the tubes, the difference current passing through the indicator 34.

This circuit may be termed a "see-saw" amplifier, because, as the conductivity of one valve goes up, the other is forced down, and vice versa. A feature of it is that it holds a stable direct-current zero relationship throughout wide changes of supply voltage and other variables. This is due to the fact that most of these variables affect both tubes alike, and therefore do not produce a difference-current affecting the output.

The movement of the indicator 34 is of the high-sensitivity D'Arsonval galvanometer type, being magnetically shielded and installed sufficiently remote from the compass section to avoid appreciable magnetic disturbance thereof.

Any number of indicators such as 34 may be added, preferably in series connection, provided that the total resistance thereof remains low relative to $r_9$ and $r_{10}$.

If the supply voltage is maintained constant, the deflection of the indicator may be calibrated in terms of the navigational features previously discussed, but this is not necessary, as it is a feature of the invention that precise steering is not required of the pilot.

While Fig. 1 shows one arrangement embodying the features of the invention wherein the instrument face carries the indicator 34, the heading tape 20 with an appropriate lubber line and the knobs 22, 28 and 30 whose functions have been described, the arrangement of the instrument may take many other forms. The optical, electrical and mechanical components of the instrument may be contained either in a single housing such as the housing 32 or they may be contained within separate housings and the indicator and course setting devices may be separated from one another. Furthermore, the course setting and the indicator feature may be arranged for multiple point mounting so that observation of the course planned, and of the course being followed, may be made at different points on the aircraft.

It is further contemplated that the integrating features of the invention, by the use of additional phototubes and circuit arrangements, may be augmented to accumulate departures from North-South and East-West axes from the starting point of a flight to permit the determination of position of the aircraft at any stage during its flight. Furthermore, while the detailed description above assumes a substantially uniform cruising speed, it is deemed to be within the scope of the invention that provisions for speed deviations may be incorporated in the instrument, one mode of accomplishing this being to vary the illuminating intensity of the lamp such as 46 in accordance with speed. Thus, actual position of the aircraft in space may automatically be calculated within an instrument. Corrections may be superimposed upon instrument indications to compensate for drift due to wind.

Electrical power for the instrument may be provided from a battery pack or from the aircraft power supply. Electrical connections to the amplifier system, which is located in the mid-part of the instrument shown, may be made in conventional manner, while connections to the rotatable compass and phototube unit may be made by flexible leads or slip rings.

In Fig. 1, screws 80 and 82 are shown for adjusting compensating magnets for the compass, and screw 84 is shown for adjusting the zero position of the indicator 34.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. A direction instrument comprising a direction sensitive element, a direction reference on the instrument, means continuously operable to sense the direction of said element and comprising an electrical error signal producer to produce an electrical current of magnitude proportional to the sine function of element deviation from the direction reference, and means to integrate said electrical error signals with respect to time comprising a capacitor to store said currents as a net static charge.

2. A directional instrument comprising a direction sensitive element, a direction reference on the instrument, means continuously operable to sense the direction of said element and comprising an electrical error signal producer to produce electrical current of magnitude proportional to the sine function of element deviation from the direction reference, means to integrate said electrical error signals with respect to time comprising a capacitor to store said electrical current as a net static charge, and means to indicate the integrated signals.

3. An integrating and direction correcting instrument for dirigible bodies comprising a direction datum, means adjustable relative to said datum to preset a desired course, means to sense instant deviations, in terms of electrical signals, from the desired course sensitive to position differences between the datum and the adjustable means, capacitor means connected to integrate and store said deviation signals relative to time, and means to utilize said integral, said sensing means comprising a phototube whose electrical output is a function of the angular deviations between said adjustable means and datum.

4. An integrating and direction correcting instrument for dirigible bodies comprising a direction datum, means adjustable relative to said datum to preset a desired course, means to sense instant deviations, in terms of electrical signals, from the desired course sensitive to position differences between the datum and the adjustable means, capacitor means connected to integrate and store said deviation signals relative to time, and means to utilize said integral, said sensing means comprising a phototube, and means associated therewith to cause the phototube electrical output to be proportional to the sine of the angle of deviation between said adjustable means and said datum.

5. An integrating and direction correcting instrument for dirigible bodies comprising a direction datum, means adjustable relative to said datum to preset a desired course, means to sense instant deviations, in terms of electrical signals, from the desired course sensitive to position differences between the datum and the adjustable means, capacitor means connected to integrate and store said deviation signals relative to time, and means to utilize said integral, said sensing means comprising an optical system having a source of illumination, means passing light therefrom proportional to the sine of the angle of deviation between said adjustable means and datum, and a phototube receiving said light and producing an electrical output proportional to the amount of light received, said electrical output comprising said deviation signals.

6. A photoelectric position take-off for a rotating body comprising illuminating means producing a main beam, shading means on the body intercepting only part of said beam, beam splitting means crossing the path of illumination through said shading means and producing a plurality of beam limbs, a plurality of phototubes, one intercepting each limb of the split beam, and a geometrically curved opaque mask bounding said main beam for modifying the response characteristics of said take-off from linearity with rotational displacement of said shading means.

7. A photoelectric position take-off for a rotating body comprising illuminating means, shading means on the body, beam splitting means crossing the path of illumination through said shading means and producing a plurality of beam limbs, a phototube intercepting each limb of the split beam, said phototubes passing electrical current signals in accordance with the intensity of respective beam limbs, and means to accumulate and store the current signals produced by said phototubes.

8. A photoelectric position take-off for a rotating body comprising illuminating means, shading means on the body, beam splitting means crossing the path of illumination through said shading means and producing a plurality of beam limbs, a phototube intercepting each limb of the split beam, said phototubes passing electrical current signals in accordance with the intensity of respective beam limbs, means to accumulate, algebraically add, and store the current signals produced by said phototubes, and means to utilize the stored signals.

9. A direction sensitive instrument comprising a movable direction reference on the instrument, a movable element, a mask cooperating therewith and movable relative thereto with the reference, having a geometric shape for generating a positive or negative integratable function of element deviation from the direction reference, means responsive to the instant position of the mask and element to pass a positive or negative electric current in accordance with the instant value of said function, and means including a capacitor algebraically summing and storing the electricity conveyed by said current to provide the integral of said function.

10. A direction sensitive instrument comprising a movable direction reference on the instrument, a movable element, a mask cooperating therewith and movable relative thereto with the reference having a geometric shape for generating a positive or negative integratable function of element deviation from the direction reference, means responsive to the instant position of said mask and element to pass a positive or negative electric current in accordance with the instant value of said function, and means including a capacitor algebraically summing and storing the electricity conveyed by said current to provide the integral of said function, said responsive means comprising a plurality of oppositely polarized photo sensitive electronic emitters having current output substantially linear with respect to the luminous input.

11. A direction sensitive instrument comprising a movable direction reference on the instrument, a movable element, a mask cooperating therewith and movable relative thereto with the reference having a geometric shape for generating a positive or negative integratable function of element deviation from the direction reference, means responsive to the instant position of said mask and element to pass a positive or negative electric current in accordance with the instant value of said function, means including a capacitor algebraically summing and storing the electricity conveyed by said current to provide the integral of said function, and potential responsive means for utilizing the value of said integral.

12. An integrating and heading correcting instrument for dirigible bodies comprising a direction datum with respect to which the body is freely turnable, an assembly containing the datum adjustable relative to the body to preset a desired course, means carried by said assembly to sense instant deviations thereof from alignment with the datum and producing electrical currents as a function of and of a sign representing positive and negative deviations and proportioned to the rate of departure of the body from the desired course, means including a capacitor for algebraically accumulating the net amounts of said currents as an electric charge representing the integral of said deviations, and means to utilize the integrated deviation.

13. An integrating and heading correcting instrument for dirigible bodies comprising a direction datum with respect to which the body is freely turnable, an assembly containing the datum adjustable relative to the body to preset a desired course, means carried by said assembly to sense instant deviations thereof from alignment with the datum and producing electrical currents as a function of and of a sign representing positive and negative deviations and proportional to the rate of departure of the body from the desired course, means including a capacitor for algebraically accumulating the net amounts of said currents as an electric charge representing the integral of said deviations, and means for utilizing the summation of the magnitudes of said currents and of existing charges for the purpose of indicating a corrective heading for said body.

14. A device for sensing a linear component of displacement based on the angular position of a rotor relative to a stator, comprising mutually cooperating light-modulating means on the rotor and stator producing a plurality of channels of light oppositely modulated by relative rotation therebetween, shading means having a boundary shaped to further modulate said light to generate a sine-function of rotor position, a plurality of electrically opposed photo-electric current modulators intercepting light from said channels, a common electrical connection for said modulators passing a positive or negative electrical current in proportion to the sine of said angular position, and means including a capacitor for algebraically accumulating and storing said electrical currents to provide a source for indication of the accumulated currents.

15. A direction instrument comprising a direction sensitive element, a direction reference on the instrument, means continuously operable to sense the direction of said element relative to the reference and comprising an error signal producer, means to integrate said error signals relative to time, means to indicate continuously the integrated signals, said indicating means comprising a device showing the direction and magnitude of the integrated signals, said instrument being turnable in a direction to remove the accumulated error signals, and biasing means operatively connected with said indicating means to cause the device to show zero error when the instrument is turned through an angle favorable to rapid diminution of the accumulated error signals.

16. An integrating direction instrument for a dirigible body comprising a direction datum, means adjustable relative to the datum to preset a desired course, means to sense instant angular deviations from the desired course sensitive to position differences between the datum and the adjustable means, means to integrate said deviations substantially instantaneously as they occur relative to time, means continuously operative to indicate the integral, said instrument being turnable with the body to a gradual corrective course to bring the body to the desired course with minimum time loss along with forward travel, and means to cause said indicating means to indicate zero course error when the body and instrument are on said corrective course.

CARL L. OTTO, Jr.

References Cited in the file of this patent

UNITED STATES PATENTS

| Number | Name | Date |
|---|---|---|
| 1,589,673 | Winter | June 22, 1926 |
| 1,702,403 | Holmes | Feb. 19, 1929 |
| 1,704,250 | Holmes | Mar. 5, 1929 |
| 1,728,904 | Herr | Oct. 17, 1929 |
| 1,741,713 | Holmes | Dec. 31, 1929 |
| 1,818,103 | Sperry | Aug. 11, 1931 |
| 1,930,496 | Wilson et al. | Oct. 17, 1933 |
| 1,985,265 | Smith | Dec. 25, 1934 |
| 2,085,010 | Dillon | June 29, 1937 |
| 2,190,950 | Potapenko | Feb. 20, 1940 |
| 2,208,147 | Eisler | July 16, 1940 |
| 2,268,256 | Knouse | Dec. 30, 1941 |
| 2,277,285 | Woodling | Mar. 24, 1942 |
| 2,320,390 | McNatt | May 25, 1943 |
| 2,325,365 | Britten | July 27, 1943 |
| 2,361,973 | Smith | Nov. 7, 1944 |
| 2,375,111 | Jones | May 1, 1945 |
| 2,447,344 | Kliever | Aug. 17, 1948 |

FOREIGN PATENTS

| Number | Country | Date |
|---|---|---|
| 305,571 | Italy | Feb. 9, 1933 |